US012331751B2

(12) United States Patent
Williams et al.

(10) Patent No.: US 12,331,751 B2
(45) Date of Patent: Jun. 17, 2025

(54) DYNAMIC ACOUSTIC-BASED FAN CONTROL

(71) Applicant: ARRIS Enterprises LLC, Suwanee, GA (US)

(72) Inventors: David J. Williams, Cumming, GA (US); Allen S. Wild, Johns Creek, GA (US); Joshua S. Brookshire, Hoschton, GA (US)

(73) Assignee: ARRIS ENTERPRISES LLC, Horsham, PA (US)

( * ) Notice: Subject to any disclaimer, the term of this patent is extended or adjusted under 35 U.S.C. 154(b) by 0 days.

(21) Appl. No.: 18/141,564

(22) Filed: May 1, 2023

(65) Prior Publication Data
US 2023/0358246 A1    Nov. 9, 2023

Related U.S. Application Data

(60) Provisional application No. 63/338,958, filed on May 6, 2022.

(51) Int. Cl.
F04D 27/00    (2006.01)

(52) U.S. Cl.
CPC ......... *F04D 27/004* (2013.01); *F04D 27/001* (2013.01)

(58) Field of Classification Search
CPC .............................. F04D 27/004; F04D 27/001
See application file for complete search history.

(56) References Cited

U.S. PATENT DOCUMENTS

2019/0361508 A1\*    11/2019   Yarragunta ........ G05D 23/1931
2022/0147125 A1\*     5/2022   Huai .................... F04D 29/582

FOREIGN PATENT DOCUMENTS

| CN | 107168400 A | * | 9/2017 | ........... F04D 27/004 |
| CN | 111142640 A | * | 5/2020 | ........... F04D 27/004 |

OTHER PUBLICATIONS

Machine Translation of CN111142640A PDF File Name: "CN111142640A_Machine_Translation.pdf".\*
Machine Translation of CN107168400A PDF File Name: "CN107168400A_Machine_Translation.pdf".\*

\* cited by examiner

*Primary Examiner* — Grant Moubry
*Assistant Examiner* — Ruben Picon-Feliciano
(74) *Attorney, Agent, or Firm* — Wenderoth, Lind & Ponack, L.L.P.

(57) ABSTRACT

A fan controller for fan of an electronic device can provide dynamic acoustic-based fan control so as to maintain a fan speed so as not to exceed an acoustic threshold. The fan controller can receive one or more temperature measurements associated with the electronic device and can based on these one or more temperature measurements determine an operational temperature of the electronic device. By dynamically and independently controlling the fan speed of a fan of the electronic device based on a determined operational temperature and the acoustic threshold, the electronic device can operate without exceeding the set acoustic threshold while maintaining the operational temperature so as prevent damage to one or more elements of the electronic device.

20 Claims, 3 Drawing Sheets

DYNAMIC ACOUSTIC-BASED FAN CONTROL

BACKGROUND

As electronic devices are increasingly used for high performance communications, for example, network communications, but are required to be enclosed in a small form factor. A small form factor can be a factor in the increase in temperature of the electronic device, for example, due to constrained air flow and limited heat dissipation. For example, a quad band extender has the capability of generating a lot of power but also a lot of heat due to the high performance of the elements of the quad band extender. Due to the heat or increased temperatures associated with such an electronic device, a fan enclosed within the electronic device can operate at a high speed. Generally, an increase in the fan speed correlates to an increase in acoustical output associated with the fan. Thus, there is a need to provide a dynamic acoustic-based fan control so as to increase user quality of experience without unsatisfactorily hindering performance of the electronic device.

SUMMARY

According to aspects of the present invention, a fan controller provides dynamic fan control based on an acoustic limit or threshold. As electronic devices, such as one or more network devices, are increasingly enclosed in smaller and smaller form factors, controlling the temperature associated with the electronic device, such as an ambient temperature, an internal temperature, or both, is becoming a key factor in improving the performance of the network and increasing the quality of experience for a user of the electronic device. One method to decrease the temperature requires increasing a speed of a fan (fan speed) within the electronic device, for example, so as to pull or circulate cooler air inside the electronic device. Increasing fan speed generally correlates to an increase in an acoustical level of the network. An increase in the acoustical output of the electronic device can be undesirable, especially when an electronic device is at or about, disposed, or otherwise positioned at a location associated with one or more users. The present invention provides a fan controller that controls or otherwise maintains a fan speed such that the acoustical output associated with the electronic device does not meet or exceed an acoustical threshold so as to prevent damage to the electronic device while providing an improved user experience.

An aspect of the present disclosure is drawn to an electronic device for controlling a speed of a fan. The electronic device comprises a fan, a memory storing one or more computer-readable instructions, and a processor coupled to the memory. The processor is configured to execute the one or more computer-readable instructions to cause the electronic device to receive one or more temperature measurements associated with the electronic device, determine an operational temperature based on at least one of the one or more temperature measurements, compare, as an operational temperature comparison, the operational temperature to at least one of one or more temperature thresholds, and alter one or more operational parameters associated with the electronic device based on the operational temperature comparison and the acoustic threshold associated with the fan.

In an aspect of the present disclosure, the processor is further configured to execute the one or more computer-readable instructions to determine an adjusted fan speed of the fan based on the operational temperature comparison, determine that the adjusted fan speed is associated with an acoustic parameter that is at or below the acoustic threshold, and wherein altering the one or more operational parameters comprises setting a fan speed of the fan to the adjusted fan speed.

In an aspect of the present disclosure, setting the fan speed of the fan to the adjusted fan speed comprises setting the fan speed to a maximum fan speed, and wherein t maximum fan speed is based on the acoustic threshold.

In an aspect of the present disclosure, the altering the one or more operational parameters comprises reducing power associated with one or more elements of the electronic device.

In an aspect of the present disclosure, the altering the one or more operational parameters comprises shutting down one or more interfaces of the electronic device.

In an aspect of the present disclosure, the processor is further configured to execute the one or more computer-readable instructions to further cause the device to determine that the operational temperature is at or exceeds a target temperature, and wherein altering the one or more operational parameters comprises increasing a fan speed of the fan to a maximum fan speed.

In an aspect of the present disclosure, the altering the one or more operational parameters comprises maintaining a fan speed of the fan at at least a minimum fan speed based on the operational temperature comparison and the acoustic threshold.

An aspect of the present disclosure is drawn to a method a fan of an electronic device based on an acoustic threshold. The method comprises receiving one or more temperature measurements associated with the electronic device, determining an operational temperature based on at least one of the one or more temperature measurements, comparing, as an operational temperature comparison, the operational temperature to at least one of one or more temperature thresholds, and altering one or more operational parameters associated with the electronic device based on the operational temperature comparison and the acoustic threshold associated with the fan.

In an aspect of the present disclosure, the method further comprises determining an adjusted fan speed of the fan based on the operational temperature comparison, determining that the adjusted fan speed is associated with an acoustic parameter that is at or below the acoustic threshold, and wherein altering the one or more operational parameters comprises setting a fan speed of the fan to the adjusted fan speed.

In an aspect of the present disclosure, the method is such that setting the fan speed of the fan to the adjusted fan speed comprises setting the fan speed to a maximum fan speed, and wherein the maximum fan speed is based on the acoustic threshold.

In an aspect of the present disclosure, the method is such that the altering the one or more operational parameters comprises reducing power associated with one or more elements of the electronic device.

In an aspect of the present disclosure, the method is such that the altering the one or more operational parameters comprises shutting down one or more interfaces of the electronic device.

In an aspect of the present disclosure; the method further comprises determining that the operational temperature is at or exceeds a target temperature, and wherein altering the one or more operational parameters comprises increasing a fan speed of the fan to a maximum fan speed.

In an aspect of the present disclosure, the method is such that altering the one or more operational parameters comprises maintaining a fan speed of the fan at at least a minimum fan speed based on the operational temperature comparison and the acoustic threshold.

An aspect of the present disclosure provides a computer readable medium of an electronic device having one or more computer-readable instructions stored thereon. The one or more computer-readable instructions when executed by a processor of the electronic device, cause the electronic device to perform one or more operations including the steps of the methods described herein.

BRIEF DESCRIPTION OF THE DRAWINGS

Like reference numbers and designations in the various drawings indicate like elements.

DETAILED DESCRIPTION

The following detailed description is made with reference to the accompanying drawings and is provided to assist in a comprehensive understanding of various example embodiments of the present disclosure. The following description includes various details to assist in that understanding; but these are to be regarded as merely examples and not for the purpose of limiting the present disclosure as defined by the appended claims and their equivalents. The words and phrases used in the following description and claims are merely used to enable a clear and consistent understanding of the present disclosure. In addition, descriptions of well-known structures, functions, and configurations may be omitted for clarity and conciseness. Those of ordinary skill in the art will recognize that various changes and modifications of the examples described herein can be made without departing from the spirit and scope of the present disclosure.

Figure 1:
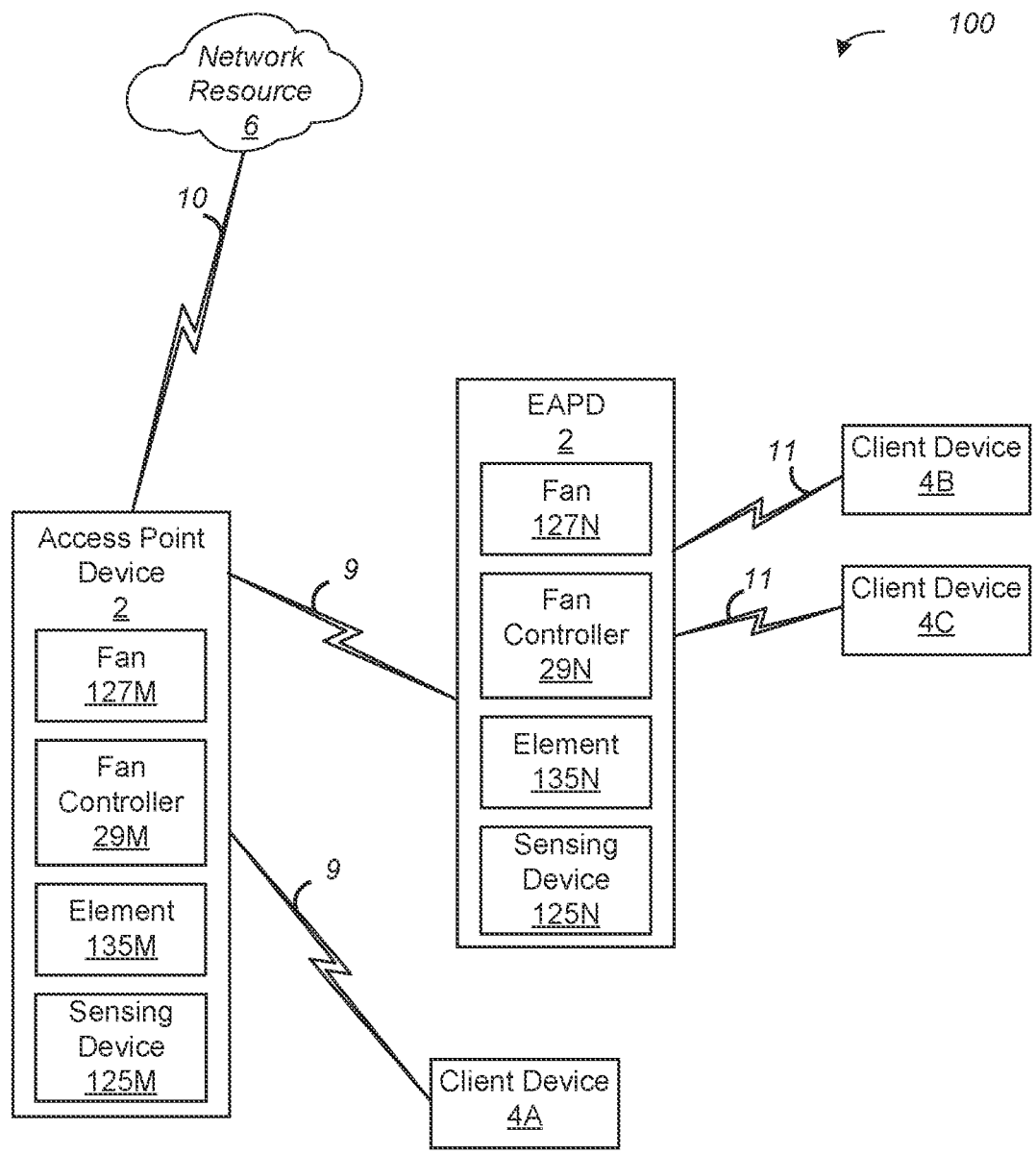
FIG. 1 is a diagram of a network environment operable to facilitate controlling a speed of a fan based on an acoustic threshold, according to one or more aspects of the present disclosure.

FIG. 1 is a diagram of a network environment 100, according to one or more aspects of the present disclosure. It should be appreciated that various example embodiments of inventive concepts disclosed herein are not limited to specific numbers or combinations of electronic devices, and there may be one or multiple of some of the aforementioned electronic devices, such as one or more network devices, in a network environment, which may itself consist of multiple communication networks and various known or future developed wireless connectivity technologies, protocols, devices, and the like.

The network environment 100 comprises one or more electronic devices connected to a network resource 6. For example, the one or more electronic devices can comprise an access point device 2, an extender access point device 3, one or more client device 4 (such as client devices 4, 4B, and/or 4C, collectively referred to as client device(s) 4). Any of the one or more electronic devices can comprise a fan 127, for example, fan 127M of an access point device 2 and/or fan 127N of an extender access point device 3, collectively referred to as a fan 127, a fan controller 29, for example, fan controller 29M of an access point device 2 and/or fan controller 29N of an extender access point device 3, collectively referred to as a fan controller 29, a sensing device 125, for example, a sensing device 125M of an access point device 2, and/or a sensing device 125N of an extender access point device, collectively referred to as a sensing device 125, and/or one or more elements 135, for example, element 135M of access point device 2 and/or element 135N of extender access point device 3, collectively referred to as an element 135. In one or more embodiments, an element 135N can comprise a quad-band extender. A quad-band extender can generate a lot of heat due to the power requirements. The quad-band extender can comprise one or more sensing devices 125N. The quad-band extender can comprise one or more interfaces for communication with one or more other network devices. The one or more electronic devices can be connected to a network resource 6, and also connected to one or more other electronic devices such as an access point device 2, an extender access point devices 3 and a client device 4. The network environment 100 includes wired and/or wireless electronic devices that may be connected in one or more wireless networks (for example, private, guest, iControl, backhaul network, or Internet of things (IoT) network) within the network environment 100. Additionally, there could be some overlap between electronic devices in the different networks. That is, one or more electronic devices could be located in more than one network. For example, the extender access point device 3 could be located both in a private network for providing content and information to a client device 4 and also included in a backhaul network or an iControl network.

A network resource 6 can be a cloud-based service that provides access to a cloud-based repository and/or service. In one or more embodiments, network resource 6 may be accessible via a cellular communications service provider. The connection 10 between the network resource 6 and the access point device 2 can be implemented using a wide area network (WAN), a virtual private network (VPN), metropolitan area networks (MANs), system area networks (SANs), a data over cable service interface specification (DOCSIS) network, a fiber optics network (e.g., FTTH (fiber to the home) or FTTX (fiber to the x), or hybrid fiber-coaxial (HFC)), a digital subscriber line (DSL), a public switched data network (PSDN), a global Telex network, or a 2G, 3G, 4G, 5G, or 6G network, for example.

The connection 10 between the network resource 6 and the access point device 2 can be implemented using a wide area network (WAN), a virtual private network (VPN), metropolitan area networks (MANs), system area networks (SANs), a data over cable service interface specification (DOCSIS) network, a fiber optics network (e.g., FTTH (fiber to the home) or FTTX (fiber to the x), or hybrid fiber-coaxial (HFC)), a digital subscriber line (DSL), a public switched data network (PSDN), a global Telex network, or a 2G, 3G, 4G, 5G, or 6G network, for example. The connection 10 can further include as some portion thereof a broadband mobile phone network connection, an optical network connection, or other similar connections. For example, the connection 10 can also be implemented using a fixed wireless connection that operates in accordance with, but is not limited to, 3rd Generation Partnership Project (3GPP) Long Term Evolution (LTE), 5G, or 6G protocols. It is also contemplated by the present disclosure that connection 13 is capable of providing connections between the access point device 2 and a WAN, a LAN, a VPN, MANs, PANs, WLANs, SANs, a DOCSIS network, a fiber optics network (e.g., FTTH, FTTX, or HFC), a PSDN, a global Telex network, or a 2G, 3G, 4G, 5G or 6G network, for example.

The access point device 2 can be, for example, an access point and/or a hardware electronic device that may be a combination modem and gateway that combines the functions of a modem, an access point (AP), and/or a router for receiving/sending information to/from a network resource 6 in the network environment 100. In one or more embodiments, the access point device 2 comprises one or more sensors 125M, one or more elements 135M, a fan 127M, and a fan controller 29M. The fan controller 29M provides dynamic acoustic-based fan speed control for a fan 127M based on one or more temperature measurements from any one or more sensing devices 125M, an acoustic threshold, or both. In one or more embodiments, the one or more sensing devices 125M are external and/or internal to the access point device 2 and/or one or more elements 135M. In one or more embodiments, the one or more sensing devices 125M detect (or otherwise provide one or more temperature measurements associated with) any of an ambient temperature of an electronic device, a temperature associated with a component and/or element 135M (such as any of a chip, a processor and/or controller (for example, a central processing unit), any other component, or any combination thereof), an internal or enclosure temperature, a surface temperature, any other associated temperature, or any combination thereof. The present disclosure all contemplates that the access point device 2 can include the function of, but is not limited to, a universal plug and play (UPnP) simple network management protocol (SNMP), an Internet Protocol/Quadrature Amplitude Modulator (IP/QAM) set-top box (STB) or smart media device (SMD) that is capable of decoding audio/video content, and playing over-the-top (OTT) or multiple system operator (MSO) provided content. The access point device 2 may also be referred to as a residential gateway, a home network gateway, or a wireless access point (AP).

The connection 9 between an access point device 2, a wireless extender access point devices 3, and a client devices 4 can be implemented using a wireless connection in accordance with any IEEE 802.11 Wi-Fi protocols, Bluetooth protocols, BLE, or other short range protocols that operate in accordance with a wireless technology standard for exchanging data over short distances using any licensed or unlicensed band such as the citizens broadband radio service (CBRS) band, 2.4 GHz bands, 5 GHz bands, 6 GHz bands, or 60 GHz bands. Additionally, the connection 9 can be implemented using a wireless connection that operates in accordance with, but is not limited to, RF4CE protocol, ZigBee protocol, Z-Wave protocol, or IEEE 802.15.4 protocol. It is also contemplated by the present disclosure that the connection 9 can include connections to a media over coax (MoCA) network. One or more of the connections 9 can also be a wired Ethernet connection. Any one or more of connections 9 can carry information on any one or more channels that are available for use.

The extender access point device (EAPD) 3 can be, for example, wireless hardware electronic devices such as access points, extenders, repeaters, etc. used to extend the wireless network by receiving the signals transmitted by the access point device 2 and rebroadcasting the signals to, for example, one or more client devices 4, such as client devices 4B and 4C, which may be out of range of the access point device 2, The extender access point device 3 can also receive signals from the client devices 4 and rebroadcast the signals to the access point device 2, or one or more other client devices 4. The extender access point device 3 can comprise a fan. 127N, a fan controller 29N, one or more elements 135N, and one or more sensing devices 125N similar to or the same as the fan 127M, the fan controller 29M, the one or more elements 135M, and the sensing device 125M, respectively, of the access point device 2.

The connection 11 between the extender access point device 3 and the one or more client devices 4 are implemented through a wireless connection that operates in accordance with any IEEE 802.11 Wi-Fi protocols, Bluetooth protocols, Bluetooth low energy (BLE), or other short range protocols that operate in accordance with a wireless technology standard for exchanging data over short distances using any licensed or unlicensed band such as the CBIS hand, 2.4 GHz bands, 5 GHz bands, 6 GHz bands or 60 GHz bands. Additionally, the connection 11 can be implemented using a wireless connection that operates in accordance with, but is not limited to, RF4CE protocol, ZigBee protocol, Z-Wave protocol, or IEEE 802.15.4 protocol. Also, one or more of the connections 11 can be a wired. Ethernet connection. Any one or more connections 11 can carry information on any one or more channels that are available for use.

The one or more client devices 4 can be, for example, hand-held computing devices, personal computers, electronic tablets, mobile phones, smart phones, smart speakers, Internet-of-Things (la) devices, iControl devices, portable music players with smart capabilities capable of connecting to the Internet, cellular networks, and interconnecting with other devices via Wi-Fi and Bluetooth, or other wireless hand-held consumer electronic devices capable of accessing a wireless network. For example, any one or more client devices 4 can be a mobile electronic device capable of connecting to a wireless network and provisioning the access point device 2 to provide a 6 GHz wireless frequency band network. Additionally, any one or more client devices 4 can be a television (TV), an IP/QAM set-top box (STB) or a streaming media decoder that is capable of decoding audio/video content, and playing over OT I' or MSO provided content received through the access point device 2.

Figure 2:
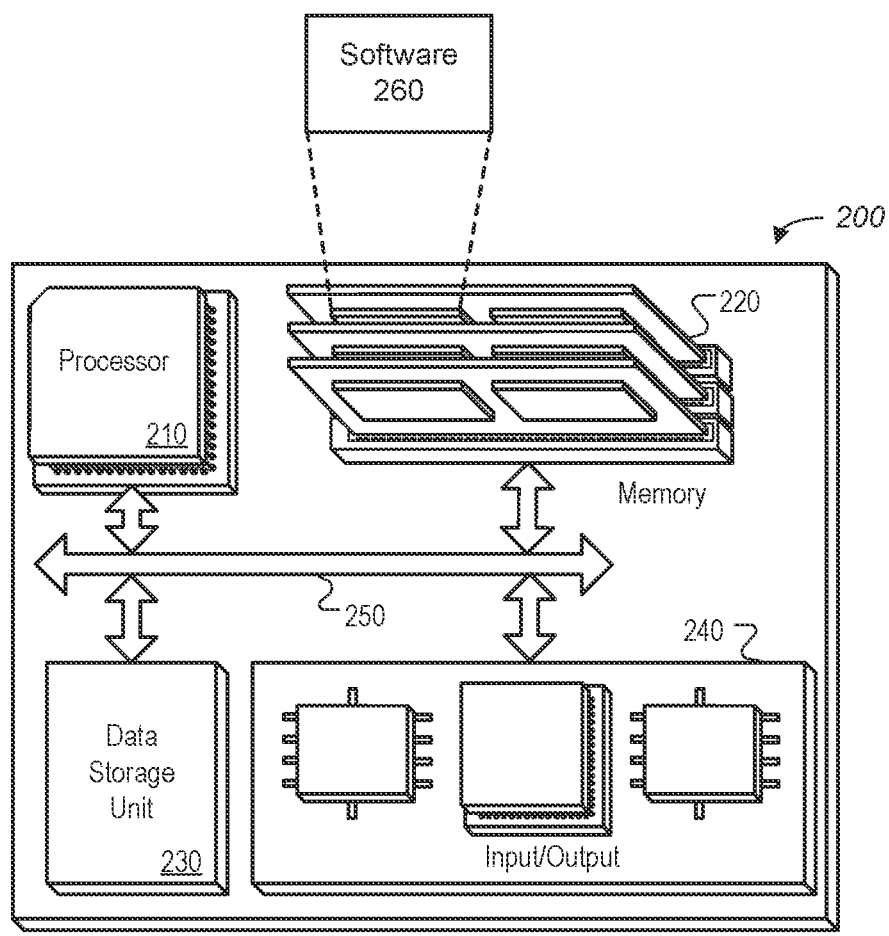
FIG. 2 is a block diagram of a hardware configuration for one or more electronic devices, according to one or more aspects of the present disclosure.

A detailed description of the exemplary internal components of the access point device 2, the extender access point device 3, and the one or more client devices 4 shown in FIG. 1 will be provided in the discussion of FIG. 2. However, in general, it is contemplated by the present disclosure that the access point device 2, the extender access point device 3, and the one or more client devices 4 include electronic components or electronic computing devices (such as one or more elements 135) operable to receive, transmit, process, store, and/or manage data and information associated with the network environment 100, which encompasses any suitable processing device adapted to perform computing tasks consistent with the execution of computer-readable instructions stored in a memory or a computer-readable recording medium (for example, a non-transitory computer-readable medium).

Further, any, all, or some of the computing components in the access point device 2, the extender access point device 3, and the one or more client devices 4 may be adapted to execute any operating system, including Linux, UNIX, Windows, MacOS, DOS, and ChromOS as well as virtual machines adapted to virtualize execution of a particular operating system, including customized and proprietary operating systems. The access point device 2, the extender access point device 3, and the one or more client devices 4 are further equipped with components to facilitate communication with other computing devices or electronic devices over the one or more network connections to local and wide area networks, wireless and wired networks, public and private networks, and any other communication network enabling communication in the network environment 100.

FIG. 2 is a block diagram of a hardware configuration 200 for one or more electronic devices, for example, within a network environment 100. The hardware configuration 200 can comprise a processor 210, a memory 220, a storage device or data storage unit 230, and an input/output (I/O) device 240. Each of the components 210, 220, 230, and 240 can, for example, be interconnected using a system bus 250. The processor 210 can be capable of processing one or more computer-readable instructions for execution within the hardware configuration 200. In one or more embodiments, the processor 210 can be a single-threaded processor. In one or more embodiments, the processor 210 can be a multi-threaded processor. The processor 210 can be capable of processing one or more computer-readable instructions stored in the memory 220 and/or on the data storage unit or storage device 230.

The memory 220 can store information within the hardware configuration 200. In one implementation, the memory 220 can be a non-transitory computer-readable medium that stores one or more computer-readable instructions that when executed by a processor 210 cause the electronic device to perform one or more operations according to one or more aspects of the present disclosure. In one implementation, the memory 220 can be a volatile memory unit. In another implementation, the memory 220 can be a non-volatile memory unit. In one or more embodiments, the storage device 230 can be capable of providing mass storage for the hardware configuration 200. In one implementation, the data storage unit 230 can be a non-transitory computer-readable medium. In various different implementations, the data storage unit 230 can, for example, include a hard disk device, an optical disk device, flash memory or some other large capacity storage device. In other implementations, the data storage unit 230 can be a device external to the hardware configuration 200.

The input/output (I/O) device 240 provides I/O operations for the hardware configuration 200. In one implementation, the I/O device 240 can include one or more of a network interface device (for example, an Ethernet card), a serial communication device (for example, an RS-232 port), one or more universal serial bus (USB) interfaces (for example, a USB 2.0 port), one or more wireless interface devices (for example, an 802.11 card) for outputting video, voice, and/or data services to a client device 140 of FIG. 1 (for example, television, set-top box (STB), computer, mobile device, tablet, telephone, wearable, etc.). As an example, the I/O device 240 can include one or more driver devices configured to send communications to, and receive communications from one or more networks and/or one or more other electronic devices. In one or more embodiments, I/O 240 provides a user interface, such as a graphical user interface, for receiving a user input, for example, one or more configuration parameters such as any of an acoustic threshold, fan speed associated with an acoustic threshold, a maximum fan speed, a minimum fan speed, one or more operational parameters associated with a fan speed, an acoustic threshold, and/or an operational temperature, a target temperature, one or more temperature thresholds, for example, associated with one or more other configuration parameters, any other parameter, or any combination thereof. In one or more embodiments, the one or more configuration parameters, including, but not limited to, the one or more operational parameters, can be configured via a network resource 6.

Software 260 can comprise one or more computer-readable instructions that when executed by the processor 210 cause the electronic device to provide dynamic acoustic-based fan control of a fan of the electronic device, according to one or more aspects of the present invention. In one or more embodiments, a fan controller 29 can comprise hardware, such as a processor 210, software, such as software 260, or both.

Figure 3:
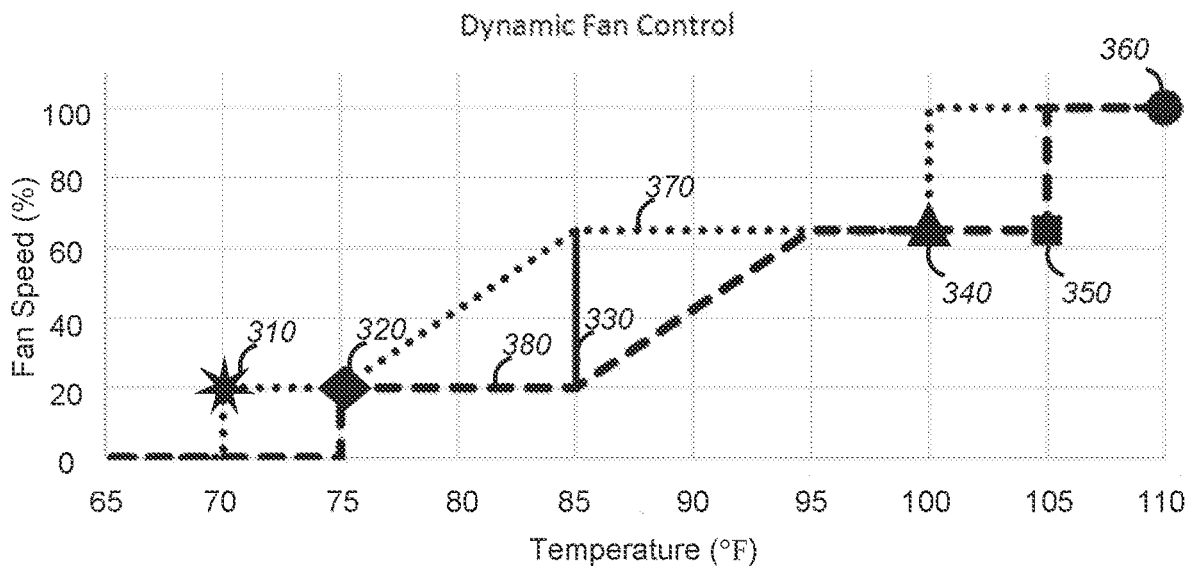
FIG. 3 is a graph illustrating a dynamic acoustic-based fan control of an electronic device, according to one or more aspects of the present disclosure.

FIG. 3 is a graph illustrating a dynamic acoustic-based fan control of an electronic device, according to one or more aspects of the present disclosure. An electronic device, such as any of an access point 2, an extender access point device 3, a client device 4, or any combination thereof, can comprise a fan controller 29 that dynamically controls the speed of a fan 127 with proportional integral derivative (ND) control based on one or more temperature or thermal measurements received from one or more sensing devices 125. The one or more temperature measurements can be received from a sensing device 125 any of in real-time, periodically, on-demand, at timed intervals, based on a semaphore, flag, and/or time, at any other time, or any combination thereof. As an example, the fan controller 29 dynamically controls the fan 127 until a fan speed is reached or exceeded such that an acoustic threshold associated with the fan speed is reach or exceeded. Once the acoustic threshold has been reached or exceeded, the fan controller alters one or more operational parameters associated with the electronic device so as to passively reduce an operational temperature of the electronic device. The one or more operational parameters can comprise a speed of the fan 127, a state of an element 135 (such as a state (for example, on or off) of an interface, a parameter associated with a sensing device 125, a parameter associated with the fan 127, or any combination thereof), a proportional, an integral, and/or a derivative coefficient, any other parameter associated with the electronic device, or any combination thereof.

The fan controller 29 determines an operational temperature associated with the electronic device. This operational temperature can be determined based on one or more temperature measurements received from one or more sensing devices 125. For example, a single temperature measurement or a plurality of temperature measurements from a single sensing device 125 or any one or more temperature measurements from any one or more sensing devices 125 can be used. In one or more embodiments, determining an operational temperature can comprise any of an average of the one or more temperature measurements, a median of the one or more temperature measurements, any other algorithm or method, or any combination thereof. In one or more embodiments, the fan controller 29 can determine for each one or more sensing devices 125 an associated requested fan speed. The fan controller can determine a target fan speed based on the one or more requested fan speeds associated with the one or more sensing devices 125, for example, the target fan speed can be a maximum the one or more requested fan speeds. The fan 127 can be associated with an upper threshold fan speed (a maximum fan speed) and a lower threshold fan speed (a minimum fan speed) such that the one or more operational parameters do not cause speed of the fan 127 to fall below or exceed a threshold fan speed (such as the upper threshold and/or lower threshold fan speeds).

FIG. 3 illustrates a graph or plot of a fan speed as a percentage of overall speed of a fan 127 (y-axis) versus an operational temperature of the electronic device x-axis). The FIG. 3 illustrates a target temperature 330 for the electronic device, a speed (or fan speed) of the fan 127 as a fan speed percentage when the operational temperature of the electronic device is decreasing (dotted line 370), a speed (or fan speed) of the fan 127 as a fan speed percentage when the operational temperature of the electronic device is increasing (dashed line 380), a first temperature threshold 310 (for example, a turn-off threshold), a second temperature threshold 320 (for example, a turn-on threshold), a third temperature threshold 340 (for example, a first tier throttle threshold), a fourth temperature threshold 350 (for example a second tier throttle threshold), and a fifth temperature threshold 360 (for example, a shut-down threshold). As the operational temperature increases from, for example, no temperature measurements received (illustrated as 0° F. (approximately −17.78° C.)), the fan controller 29 can alter one or more operational parameters of the electronic device, such as cause the fan 127 to turn "on" or otherwise alter a speed of the fan 127. For example, the fan controller 29 can alter a speed of the fan 127 from 0% (a fan state of "off") at 0° F. (approximately −17.78° C.) to a minimum fan speed of 20% (a fan state of minimum "on") when the operational temperature meets or exceeds a second temperature (or a turn-on) threshold 320 of 75° F. (approximately 2389° C.) (as shown by dashed line 380). If this altering the speed of the fan to 20% of maximum fan speed is sufficient to maintain an operational temperature of 75° F. (approximately 23.89° C.), the fan speed will remain at 20% at least until the operational temperature decreases at or below a first temperature (or turn-oft) threshold 310 of 70° F. (approximately 23.89° C.) (as shown by dotted line 370).

If the operational temperature of the electronic device continues to increase from 75° F. (approximately 23.89° C.) (for example, beyond the second temperature threshold 320), the fan controller 29 will dynamically alter one or more operational parameters of the electronic device, for example, alter a speed of the fan 127 using a PID controller allowing the speed of the fan 127 to change between the minimum fan speed (for example, 20%) and a maximum fan speed (for example, 65%), as shown by dashed line 380. The maximum fan speed can be associated with an acoustic threshold, for example, a value set by a user, an operator, or otherwise preconfigured that indicates an acoustic output that should not be reached or exceeded by operation of the fan 127. For example, the fan speed at 65% of maximum can be the highest fan speed for operation of the fan that does not exceed an acoustic threshold.

If the maximum fan speed does not decrease the operational temperature such that the operational temperature reaches or exceeds a third temperature (or first tier throttle) threshold 340, for example, at or above 100° F. (approximately 37.78° C.), the fan controller 29 alters one or more operational parameters associated with the electronic device (such as one or more operational parameters associated with a first tier throttle configuration), for example, one or more elements 135 of the electronic device can be throttled, such as a reduction in performance of one or more elements 135 so as to reduce power (for example, a performance factor of one or more interfaces can be reduced or limited). Any of the one or more elements 135 can be controlled independently of any other of the one or more elements 135.

If the operational temperature continues to increase so as to reach or exceed a fourth temperature (or second tier throttle) threshold 350, for example, 105° F. (approximately 40.56° C.), the fan controller 29 again alters one or more operational parameters associated with the electronic device (such as one or more operational parameters associated with a second tier throttle configuration), for example, the speed of the fan 127 can be increased above the acoustic threshold. If the operational temperature continues to increase when the fan is operating at a speed above the acoustic threshold such that the operational temperature reaches or exceeds a fifth temperature (a shut-down) threshold 360, the fan controller 29 one or more elements 135 can be shut-down, such as power can be removed from one or more interfaces.

If the operational temperature decreases from the fifth temperature threshold 360, the fan speed and/or one or more operational parameters can be altered. For example, when the operational temperature decreases to a temperature that is at or below a third operational temperature, the fan speed can be reduced from 100% to 65% as illustrated by the dotted line 370. One or more operational parameters can also be altered, for example, power to one or more elements 135 can be restored and/or performance of the one or more elements 135 can be increased, such as one or more interfaces can be powered-on or performance increased (for example, a duty cycle associated with an interface can be altered, such as increased to a previous level). As the operational temperature continues to decrease to at or below a target temperature 330, the fan speed can also be decreased until the fan speed reaches a minimum 20%. In this way, the fan speed of a fan 127 of an electronic device can by dynamically controlled based on an acoustic threshold and an operational temperature of the electronic device.

In one or more embodiments, the altering the one or more operational parameters comprises altering an operation associated with one or more elements 135 independently. For example, a first operational parameter associated with a first element 135 can be operated distinctly and/or independently from a second operational parameter associated with a second element 135.

Figure 4:
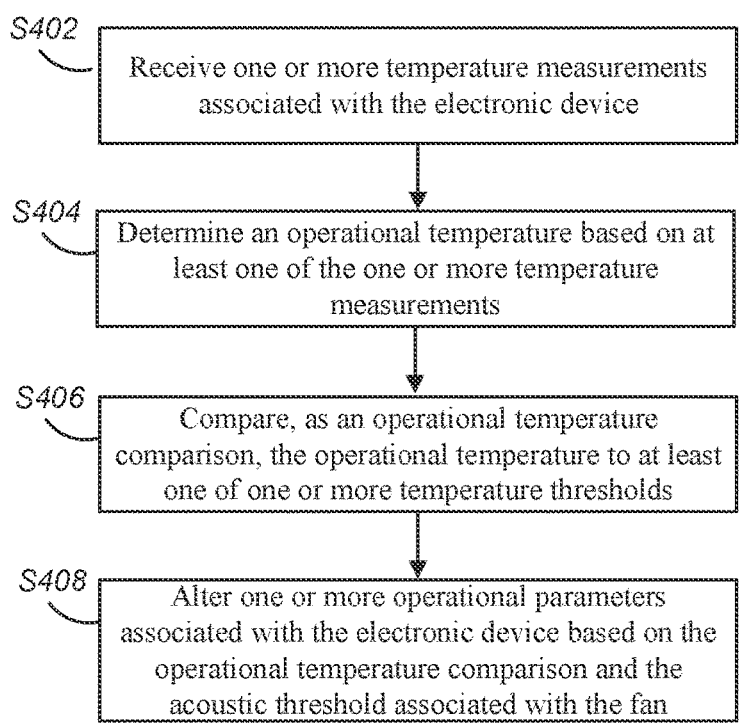
FIG. 4 is a flowchart for a method for dynamic acoustic-based fan control, according to one or more aspects of the present disclosure.

FIG. 4 is a flowchart for a method for dynamic acoustic-based fan control, according to one or more aspects of the present disclosure. In FIG. 4, it is assumed that any one or more electronic devices include their respective controllers and/or processors and their respective software (such as one or more computer-readable instructions) stored in their respective memories, as discussed above in reference to FIGS. 1-3, which when executed by their respective controllers perform one or more functions or operations in accordance with the example embodiments of the present disclosure.

The processor 210 executes one or more computer-readable instructions, stored in a memory, for example, a memory 220 of an electronic device, that when executed by the processor 210 perform and/or cause the electronic device to perform one or more of the operations of steps 402-408. In one or more embodiments, the one or more computer-readable instructions may be one or more software applications. While the steps 402-408 are presented in a certain order, the present disclosure contemplates that any one or more steps can be performed simultaneously, substantially simultaneously, repeatedly, in any order or not at all (omitted).

The process for dynamic acoustic-based fan control of a fan of an electronic device begins at step S402, with the electronic device receiving one or more temperature measurements associated with the electronic device. For example, the electronic device can comprise one or more sensing devices 125 or otherwise be connected to one or more sensing devices 125 that sense a thermal parameter, such as one or more temperature measurements. The one or more temperature measurements can be received from a single source, such as a single sensing device 125, or a plurality of sources, such as a plurality of sensing devices. In one or more embodiments, the one or more temperature measurements can be sent to a network resource, for example, periodically or at timed intervals. The one or more temperature measurements can be stored in a memory locally at or remotely from the electronic device. Any one or more elements or components of the electronic device can comprise or be connected to one or more sensing devices 125.

At step S404, the electronic device determines an operational temperature based on at least one of the one or more temperature measurements. The operational temperature can correspond to an ambient temperature, an internal temperature, or both of the electronic device. At step S406, the electronic device compares the operational temperature to at least one of one or more temperature thresholds associated with the electronic device. The one or more temperature thresholds can comprise a range, such as a lower temperature threshold and an upper temperature threshold, or a discreet value.

At step 408, the electronic device alters one or more operational parameters associated with the electronic device based on the operational temperature comparison and the acoustic threshold associated with the fan. The acoustic threshold can be based on any of one or more user configured settings, such as acoustic limits set by a customer, a manufacturer, an administration, any other user, or any combination thereof, one or more default settings established for a particular electronic device, a configuration from a network resource 6, or any combination thereof. In one or more embodiments, the electronic device can further determine an adjusted fan speed of a fan of the electronic device based on the operational temperature comparison and determine that the adjusted fan speed is associated with an acoustic parameter that is at or below an acoustic threshold. The altering the one or more operational parameters can comprise any of setting the fan speed to a maximum fan speed based with the maximum fan speed is based on the acoustic threshold, reducing power associated with one or more elements of the electronic device, shutting down one or more interfaces of the electronic device, increasing a fan speed of the fan to a maximum fan speed when determined that the operational temperature is at or exceeds a target temperature, maintaining a fan speed of the fan at at least a minimum fan speed based on the operational temperature comparison and the acoustic threshold, or any combination thereof.

In this way, any one or more fans of an electronic device can be dynamically and independently controlled so as to maintain operation of the electronic device within acoustic limits, such as at or below an acoustic threshold.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication or access network.

The processes and logic flows described in this specification are performed by one or more programmable processors executing one or more computer programs to perform functions by operating on input data and generating output thereby tying the process to a particular machine (e.g.; a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

We claim:

1. An electronic device comprising:
   a fan, wherein the fan is associated with an acoustic threshold;
   an extender comprising one or more sensing devices and one or more interfaces for communication with one or more network devices;
   a memory storing one or more computer-readable instructions; and
   a processor configured to execute the one or more computer-readable instructions to cause the electronic device to:
      receive, from the one or more sensing devices, one or more temperature measurements associated with the electronic device, wherein at least one of the one or more temperature measurements is associated with the extender;
      determine an operational temperature of the electronic device based on the one or more temperature measurements;
      compare, as an operational temperature comparison, the operational temperature to at least one of one or more temperature thresholds associated with one or more configuration parameters; and
      alter, dynamically, one or more operational parameters of a plurality of operational parameters associated with the electronic device based on the operational temperature comparison and the acoustic threshold associated with the fan, the one or more operational parameters associated with a first tier throttle configuration, a second tier throttle configuration, or both.

2. The electronic device of claim 1, wherein the processor is further configured to execute the one or more computer-readable instructions to:
   determine an adjusted fan speed of the fan based on the operational temperature comparison;
   determine that the adjusted fan speed is associated with an acoustic parameter that is at or below the acoustic threshold; and
   wherein altering the one or more operational parameters comprises setting a fan speed of the fan to the adjusted fan speed.

3. The electronic device of claim 2, wherein setting the fan speed of the fan to the adjusted fan speed comprises setting the fan speed to a maximum fan speed, and wherein the maximum fan speed is based on the acoustic threshold.

4. The electronic device of claim 1, wherein the altering the one or more operational parameters comprises reducing power associated with one or more elements of the electronic device.

5. The electronic device of claim 1, wherein the altering the one or more operational parameters comprises shutting down one or more interfaces of the electronic device.

6. The electronic device of claim 1, wherein the processor is further configured to execute the one or more computer-readable instructions to further cause the device to:
   determine that the operational temperature is at or exceeds a target temperature; and
   wherein altering the one or more operational parameters comprises increasing a fan speed of the fan to a maximum fan speed.

7. The electronic device of claim 1, wherein altering the one or more operational parameters comprises:
   maintaining a fan speed of the fan that is at least a minimum fan speed based on the operational temperature comparison and the acoustic threshold.

8. A method for controlling a fan of an electronic device based on an acoustic threshold, the method comprising:
   receiving, from one or more sensing devices of an extender, one or more temperature measurements associated with the electronic device, wherein the electronic device comprises the extender that comprises one or more interfaces for communication with one or more network devices, and wherein at least one of the one or more temperature measurements is associated with the extender;
   determining an operational temperature of the electronic device based on the one or more temperature measurements;
   comparing, as an operational temperature comparison, the operational temperature to at least one of one or more temperature thresholds associated with one or more configuration parameters; and
   altering, dynamically, one or more operational parameters of a plurality of operational parameters associated with the electronic device based on the operational temperature comparison and the acoustic threshold associated with the fan, the one or more operational parameters associated with a first tier throttle configuration, a second tier throttle configuration, or both.

9. The method of claim 8, further comprising:
   determining an adjusted fan speed of the fan based on the operational temperature comparison;
   determining that the adjusted fan speed is associated with an acoustic parameter that is at or below the acoustic threshold; and
   wherein altering the one or more operational parameters comprises setting a fan speed of the fan to the adjusted fan speed.

10. The method of claim 8, wherein setting the fan speed of the fan to the adjusted fan speed comprises setting the fan speed to a maximum fan speed, and wherein the maximum fan speed is based on the acoustic threshold.

11. The method of claim 8, wherein the altering the one or more operational parameters comprises reducing power associated with one or more elements of the electronic device.

12. The method of claim 11, wherein the altering the one or more operational parameters comprises shutting down one or more interfaces of the electronic device.

13. The method of claim 8, further comprising:
   determining that the operational temperature is at or exceeds a target temperature; and
   wherein altering the one or more operational parameters comprises increasing a fan speed of the fan to a maximum fan speed.

14. The method of claim 8, wherein altering the one or more operational parameters comprises:
  maintaining a fan speed of the fan that is at least a minimum fan speed based on the operational temperature comparison and the acoustic threshold.

15. A non-transitory, computer-readable medium of an electronic device storing one or more computer-readable instructions for controlling a fan speed of a fan of the electronic device based on an acoustic threshold that when executed by a processor, cause the device to perform one or more operations comprising:
  receiving, from one or more sensing devices of an extender, one or more temperature measurements associated with the electronic device, wherein the electronic device comprises the extender that comprises one or more interface for communication with one or more network devices, and wherein at least one of the one or more temperature measurements is associated with the extender;
  determining an operational temperature of the electronic device based on the one or more temperature measurements;
  comparing, as an operational temperature comparison, the operational temperature to at least one of one or more temperature thresholds associated with one or more configuration parameters; and
  altering, dynamically, one or more operational parameters of a plurality of operational parameters associated with the electronic device based on the operational temperature comparison and the acoustic threshold associated with the fan, the one or more operational parameters associated with a first tier throttle configuration, a second tier throttle configuration, or both.

16. The non-transitory, computer-readable medium of claim 15, wherein the one or more computer-readable instructions when executed by the processor, further cause the processor to perform the one or more operations further comprising:
  determining an adjusted fan speed of the fan based on the operational temperature comparison;
  determining that the adjusted fan speed is associated with an acoustic parameter that is at or below the acoustic threshold; and
  wherein altering the one or more operational parameters comprises setting a fan speed of the fan to the adjusted fan speed.

17. The non-transitory, computer-readable medium of claim 16, wherein setting the fan speed of the fan to the adjusted fan speed comprises setting the fan speed to a maximum fan speed, and wherein the maximum fan speed is based on the acoustic threshold.

18. The non-transitory, computer-readable media of claim 15, wherein the altering the one or more operational parameters comprises at least one of:
  reducing power associated with one or more elements of the electronic device; and
  shutting down one or more interfaces of the electronic device.

19. The non-transitory computer-readable media of claim 15, wherein the one or more computer-readable instructions when executed by the processor, further cause the processor to perform the one or more operations further comprising:
  determining that the operational temperature is at or exceeds a target temperature; and
  wherein altering the one or more operational parameters comprises increasing a fan speed of the fan to a maximum fan speed.

20. The non-transitory computer-readable media of claim 15, wherein altering the one or more operational parameters comprises:
  maintaining a fan speed of the fan that is at least a minimum fan speed based on the operational temperature comparison and the acoustic threshold.

* * * * *